(12) United States Patent
Aimasso et al.

(10) Patent No.: US 11,767,774 B2
(45) Date of Patent: Sep. 26, 2023

(54) POPPET VALVE

(71) Applicant: Eaton Intelligent Power Limited, Dublin (IE)

(72) Inventors: Alberto Aimasso, Rivoli (IT); Luigi Lia, Turin (IT); Francesca Mancuso, Turin (IT)

(73) Assignee: EATON INTELLIGENT POWER LIMITED, Dublin (IE)

( * ) Notice: Subject to any disclaimer, the term of this patent is extended or adjusted under 35 U.S.C. 154(b) by 252 days.

(21) Appl. No.: 16/759,745

(22) PCT Filed: Oct. 17, 2018

(86) PCT No.: PCT/EP2018/078338
§ 371 (c)(1),
(2) Date: Apr. 28, 2020

(87) PCT Pub. No.: WO2019/086244
PCT Pub. Date: May 9, 2019

(65) Prior Publication Data
US 2021/0180479 A1   Jun. 17, 2021

(30) Foreign Application Priority Data

Oct. 30, 2017 (EP) .................................. 17199290
Dec. 21, 2017 (GB) .................................. 1721575

(51) Int. Cl.
*F01L 3/04* (2006.01)
*C23C 4/01* (2016.01)
(Continued)

(52) U.S. Cl.
CPC .................... *F01L 3/04* (2013.01); *B21K 1/22* (2013.01); *B23P 15/002* (2013.01); *C23C 4/01* (2016.01);
(Continued)

(58) Field of Classification Search
CPC . F01L 3/04; F01L 3/02; F01L 2301/00; F01L 3/14; F01L 3/12; F16K 27/00; F16K 49/00
See application file for complete search history.

(56) References Cited

U.S. PATENT DOCUMENTS 4,346,870 A * 8/1982 Chute ..................... F02B 77/11
251/356
5,040,501 A   8/1991 Lemelson
(Continued)

FOREIGN PATENT DOCUMENTS

| CN | 1163341 A | 10/1997 |
| CN | 103925028 A | 7/2014 |

(Continued)

OTHER PUBLICATIONS

International Search Report issued in corresponding application No. PCT/EP2018/078338 dated Nov. 28, 2018, 4 pages.
(Continued)

*Primary Examiner* — Long T Tran
(74) *Attorney, Agent, or Firm* — Pearne & Gordon LLP

(57) ABSTRACT

A poppet valve includes: a valve body comprising a valve stem body, a valve head body with a valve combustion face, and a valve fillet body interconnecting the valve stem body and the valve head body. The valve fillet body surface has an increased thermal resistance compared to the valve combustion face.

10 Claims, 2 Drawing Sheets

(51) Int. Cl.
    *C23C 4/11* (2016.01)
    *C23C 4/129* (2016.01)
    *C23C 4/134* (2016.01)
    *B21K 1/22* (2006.01)
    *B23P 15/00* (2006.01)
    *C23C 4/02* (2006.01)
    *F16K 1/38* (2006.01)

(52) U.S. Cl.
    CPC .............. *C23C 4/02* (2013.01); *C23C 4/11* (2016.01); *C23C 4/129* (2016.01); *C23C 4/134* (2016.01); *F16K 1/385* (2013.01); *F01L 2303/00* (2020.05)

(56) References Cited

U.S. PATENT DOCUMENTS

| | | |
|---|---|---|
| 6,718,932 B1 | 4/2004 | Cecur et al. |
| 2007/0240668 A1 | 10/2007 | Burton et al. |
| 2008/0032065 A1 | 2/2008 | Burton et al. |
| 2010/0077983 A1* | 4/2010 | Yamada ............... F01L 3/04 123/188.9 |
| 2014/0345557 A1* | 11/2014 | Veliz ............... C23C 4/073 427/456 |
| 2015/0300215 A1 | 10/2015 | Baek et al. |
| 2015/0308303 A1 | 10/2015 | Baek et al. |
| 2016/0097459 A1* | 4/2016 | Veliz ............... C23C 8/30 427/372.2 |
| 2016/0348546 A1* | 12/2016 | Kurahashi ............... F01L 3/04 |
| 2016/0356186 A1* | 12/2016 | Tsuneishi ............ F16K 27/0209 |
| 2018/0298792 A1* | 10/2018 | Torii ............... C23C 8/34 |

FOREIGN PATENT DOCUMENTS

| | | |
|---|---|---|
| EP | 1353045 A2 | 10/2003 |
| JP | 2003239076 A | 8/2003 |
| JP | 2008248735 A | 10/2008 |
| JP | 2013170555 A | 9/2013 |
| KR | 20160093028 A | 8/2016 |
| WO | WO 9313245 A1 | 7/1993 |
| WO | WO 2007115043 A2 | 10/2007 |
| WO | WO 2016147428 A1 | 9/2016 |
| WO | WO 2017087734 A1 | 5/2017 |

OTHER PUBLICATIONS

Written Opinion issued in corresponding application No. PCT/EP2018/078338 dated Nov. 28, 2018, 7 pages.

* cited by examiner

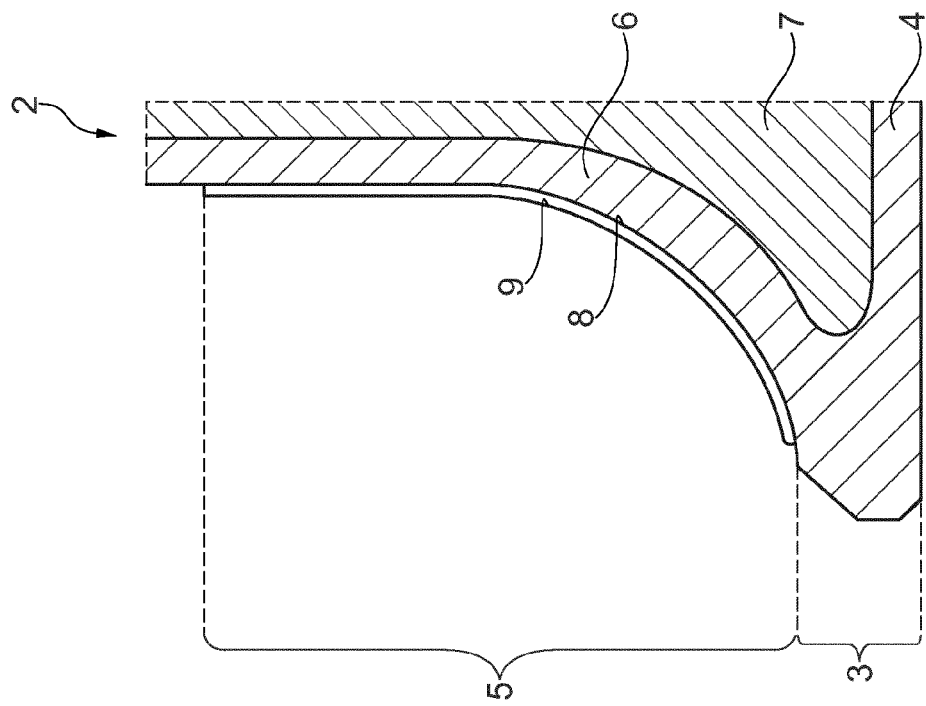
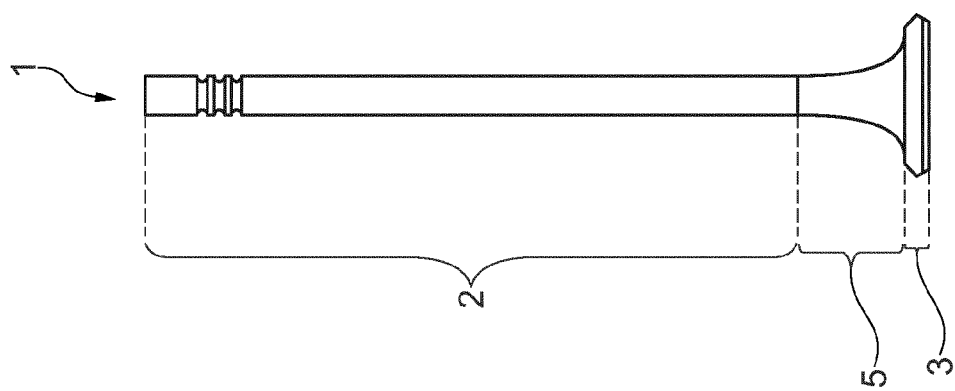

POPPET VALVE

CROSS-REFERENCE TO PRIOR APPLICATIONS

This application is a U.S. National Phase application under 35 U.S.C. § 371 of International Application No. PCT/EP2018/078338, filed on Oct. 17, 2018, and claims benefit to British Patent Application No. GB 1721575.7, filed on Dec. 21, 2017 and to European Patent Application No. EP 17199290.2, filed on Oct. 30, 2017. The International Application was published in English on May 9, 2019 as WO 2019/086244 under PCT Article 21(2).

FIELD

The invention relates to a poppet valve having a valve body comprising a valve stem body, a valve head body with a valve combustion face and a valve fillet body interconnecting the valve stem body and the valve head body.

BACKGROUND

Poppet valves are used in combustion engines. In such a combustion engine the valve combustion face is subjected to the hot combustion gases. Also the valve fillet body surface is subjected to the gases, when the combustion gases flow out of the cylinder along the valve fillet body surface. The hot combustion gases cause thermal stress in the poppet valve, which will lead to wear of the poppet valve.

U.S. Pat. No. 5,040,501 discloses a poppet valve wherein by coating the entire head and stem of the poppet valve with synthetic diamond and overcoating or plating a solid lubricant, such as chromium on the outer surface of the diamond coating a number of advantages are achieved. These advantages included better heat and corrosion resistance, reduced wear resulting from seat and valve head impact contact and a reduction in the enlargement of surface cracks.

From U.S. Pat. No. 6,718,932 it is known that the valve stem is coated with chromium plated coating, molybdenum sprayed coating, an Eatonite coating, physical vapor deposition (PVD) or chemical vapor deposition (CVD) type coatings or a nitride coating. Such coatings are typically used for reduction of friction.

Within different parts of a combustion engine it is furthermore known to apply coatings for insulation. For example U.S. Pat. No. 4,346,556 discloses an insulating liner for use in an exhaust port of an internal combustion engine or the like, consisting of a formed thin wall tubular body of rigidized fibrous ceramic such as fibrous alumina-silica material with an abrasion resistant ceramic coating fused onto the inner gas-exposed surface of the body. The coating comprises a mixture of fused silica cement and fine glass sintered in place on the body inner surface at a temperature below that which would damage the thin walls of the body.

It is furthermore known to provide hollow poppet valves filled with a heat conducting material, such as sodium. The cavity in the poppet valve can be arranged in the valve head body, the valve stem body or the full valve body.

Furthermore, the hollow poppet valve can be manufactures out of one piece or more pieces, such as a head part and a stem part, which is then welded to the head part. The head could also be made by forging the head part and then closing the head part with a cap, which will form the valve combustion face.

The heat conducting material is transporting heat from the valve head to the valve stem and from there into the valve guide. However, combustion gases which leave the cylinder flow along the valve fillet body and will further heat up the poppet valve. This has a negative impact on the knocking properties of the combustion engine.

SUMMARY

In an embodiment, the present invention provides a poppet valve, comprising: a valve body comprising a valve stem body, a valve head body with a valve combustion face, and a valve fillet body interconnecting the valve stem body and the valve head body, wherein the valve fillet body surface has an increased thermal resistance compared to the valve combustion face.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 shows an embodiment of a poppet valve according to the invention.

FIG. 2 shows an enlarged cross-sectional view of the poppet valve of FIG. 1.

DETAILED DESCRIPTION

Figure 3:
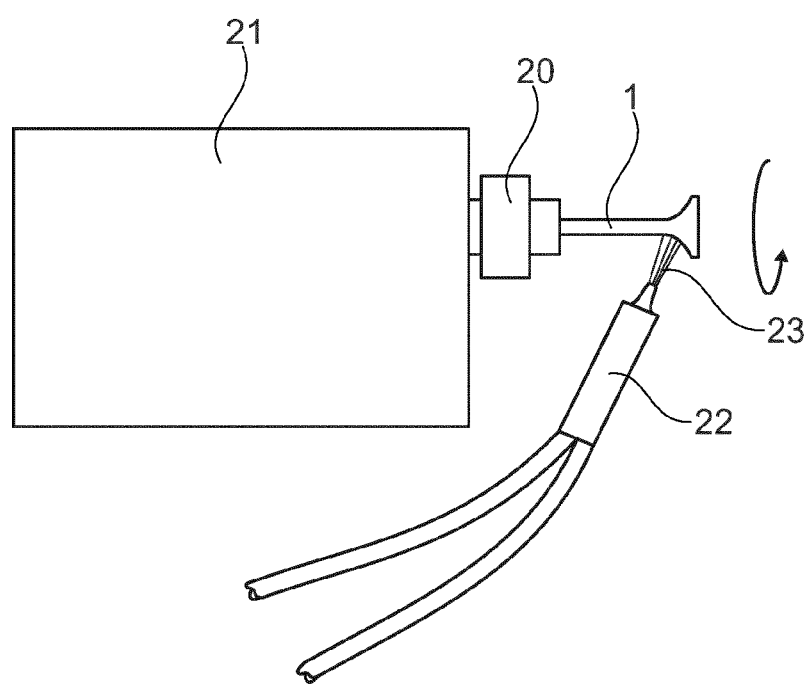
FIG. 3 shows an embodiment of the method according to the invention.

In an embodiment, the present invention reduces or removes the above mentioned disadvantages.

In an embodiment, the present invention provides a poppet valve, which is characterized in that the valve fillet body surface has an increased thermal resistance compared to the valve combustion face.

With the poppet valve according to the invention heat is less susceptible to be taken up by the fillet body surface than by the valve combustion face by having the valve fillet body surface more resisting heat flow, i.e. having an increased thermal resistance.

It is the invention that the valve fillet body surface resists taking up heat more than other surfaces. Preferably, the body parts themselves have a similar thermal resistance, such that once heat has been taken up, the heat can flow without further resistance through the poppet valve body, such that thermal stresses due to large temperature differences within the poppet valve body are reduced.

With the increased thermal resistance of the valve fillet body surface, the heat at the valve combustion surface can be transported away more easily resulting in a lower temperature of at least the valve combustion surface.

A high temperature on of the valve combustion face has a negative impact on the knocking tendency of an combustion engine. Now the temperature of the valve combustion face of a poppet valve according to the invention can be lowered the knocking tendency, with all the related disadvantages is reduced or even removed.

In a preferred embodiment of the poppet valve according to the invention a thermal barrier coating is arranged on the valve fillet body to provide an increased thermal resistance.

The thermal barrier coating ensures that the valve fillet body surface is less susceptible for taking up heat compared to a surface without an thermal barrier coating, such as the valve combustion face.

Preferably, the thermal barrier coating is provided by ferrite particles arranged by crystal growth, by a silica based inorganic compound, by spray painting of hollow ceramic balls or by a thermal spray of Yttria-stabilized zirconia.

These thermal barrier coatings provide a reliable and durable coating, which can endure the conditions present in a combustion engine.

In a further embodiment of the poppet valve according to the invention a bond coating is interposed between the thermal barrier coating and the valve fillet body.

In order to further improve adherence of the thermal barrier coating to the valve fillet body, a suitable bond coating can be arranged between the valve fillet body and the thermal barrier coating.

Preferably, the coating thickness is between 0.1 mm and 0.6 mm, which allows for a sufficient increased thermal resistance, while the shape of the poppet valve is not influenced to a relevant degree.

In a further preferred embodiment of the poppet valve according to the invention the valve combustion face is uncoated.

By having an uncoated valve combustion face and a thermal barrier coating arranged on the valve fillet body the difference in thermal resistance is optimal. This ensures that heat from the valve combustion face can be transported optimally through the valve body towards the valve stem body and from there to the valve stem guide, without being hindered by additional heat flowing from the valve fillet body surface into the poppet valve body.

In yet a further preferred embodiment of the poppet valve according to the invention a cavity is arranged in the valve body and the cavity is filled with a heat conducting material, such as sodium. This cavity can be obtained by forging the poppet valve out of one piece, but it is also possible to obtain the valve out of two or more parts, which are welded together.

The cavity filled with the heat conducting material further promotes the heat flow from the valve combustion face towards the valve stem body and into the valve stem guide.

The invention further relates to a method for manufacturing a poppet valve according to the invention, which method comprises the steps of:

providing a poppet valve having a valve body composed out of a valve stem body, a valve head body with a valve combustion face and a valve fillet body interconnecting the valve stem body and the valve head body;

using either atmospheric plasma spraying (APS) or high velocity oxygen fuel spraying (HVOF) for arranging a thermal barrier coating on at least part of the valve fillet body surface.

With the method according to the invention, already available poppet valves can easily be adapted to a poppet valve according to the invention, simply by spraying the coating on the valve fillet body surface by using APS or HVOF.

In a preferred embodiment of the method according to the invention the poppet valve is rotated around the longitudinal axis, while the thermal barrier coating is arranged.

A regular poppet valve can for example be clamped in a rotating head, while a nozzle for using APS or HVOF is stationary arranged and directed to the valve fillet body. This allows for a quick application of a thermal barrier coating to the valve fillet body surface of a ready available poppet valve and also allows for automation of the process.

FIG. 1 shows a poppet valve 1 with a valve stem body 2, a valve head body 3 with a valve combustion face 4 and a valve fillet body 5 interconnecting the valve stem body 2 and the valve head body 3.

The combined valve stem body 2, valve fillet body 5 and the valve head body 3 is designated as the valve body. Typically, the valve body is manufactured from one piece of material, or as two pieces of the same material welded together after forming.

FIG. 2 shows an enlarged cross-sectional view of the poppet valve 1. The valve body 6 is provided with a cavity 7 filled with preferably sodium. The sodium provides an increased heat transfer within the valve body 6, such that heat of the combustion gases getting in contact with the valve combustion face 4 is transferred to the valve stem body 2, which will typically be guided within a valve stem guide of a combustion engine and allows for cooling of the poppet valve 1.

The valve fillet body surface 8 is coated with a thermal barrier coating 9, such that hot exhaust gases flowing along the valve fillet body 5 do not further increase the temperature of the poppet valve 1, or at least any heating up by the exhaust gases is reduced due to the thermal barrier coating 9.

FIG. 3 shows schematically an embodiment of the method according to the invention. A poppet valve 1 is clamped into a clamping head 20 arranged to a housing 21 in which drive means are provided for rotating the clamping head 20 and accordingly for rotating the poppet valve 1.

Furthermore, a spray nozzle 22 is positioned in the direction of the fillet body part of the poppet valve 1. This spray nozzle 22 can be for example of an atmospheric plasma spraying (APS) system or high velocity oxygen fuel spraying (HVOF) system. The spray 23 is deposited on the poppet valve 1, while the poppet valve 1 is rotated, such that a thermal barrier coating is arranged on the valve fillet body surface of the poppet valve 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1. Poppet valve
2. Valve stem body
3. Valve head body
4. Valve combustion face
5. Valve fillet body
6. Valve body
7. Cavity
8. Valve fillet body surface
9. Thermal barrier coating
20. Clamping head
21. Housing
22. Spray nozzle
23. spray

The invention claimed is:

1. A poppet valve, comprising:
a valve body comprising a valve stem body, a valve head body with an uncoated valve combustion face provided on a first side of the valve head body, a cavity arranged in one or both of the valve stem body and the valve head body, and a valve fillet body interconnecting the valve stem body to a second side of the valve head body, the second side being opposite the first side,
wherein an exterior surface of the valve fillet body has an increased thermal resistance compared to the valve combustion face, and
wherein a thermal barrier coating is arranged on the valve fillet body to provide the increased thermal resistance, the thermal barrier coating comprising ferrite particles arranged by crystal growth, a silica based inorganic compound, spray painting of hollow ceramic balls, or a thermal spray of Yttria-stabilized zirconia.

2. The poppet valve according to claim 1, wherein a bond coating is interposed between the thermal barrier coating and the valve fillet body.

3. The poppet valve according to claim 1, wherein a coating thickness is between 0.1 mm and 0.6 mm.

4. The poppet valve according to claim 1, wherein the valve combustion face is uncoated.

5. The poppet valve according to claim 1, wherein the cavity is filled with a heat conducting material.

6. The poppet valve according to claim 5, wherein the heat conducting material comprises sodium.

7. A method for manufacturing the poppet valve according to claim 1, which method comprises the steps of:
providing the poppet valve having the valve body comprising the valve stem body, the valve head body with the uncoated valve combustion face, the cavity arranged in one or both of the valve stem body and the valve head body, and the valve fillet body interconnecting the valve stem body and the valve head body; and
using either atmospheric plasma spraying (APS) or high velocity oxygen fuel spraying (HVOF) to arrange a thermal barrier coating on at least part of the exterior surface of the valve fillet body.

8. The method according to claim 7, wherein the poppet valve is rotated around a longitudinal axis thereof while the thermal barrier coating is arranged.

9. The method of claim 7, further comprising filling the cavity with a heat conducting material.

10. The poppet valve according to claim 1, wherein the uncoated valve combustion face is provided on an entirety of the first side of the valve head body.

* * * * *